(12) United States Patent
Zhang et al.

(10) Patent No.: US 12,545,748 B2
(45) Date of Patent: Feb. 10, 2026

(54) WATER-SOLUBLE 1,3-DIPHENYLGUANIDINE (DPG)-BASED SUPRAMOLECULAR INCLUSION COMPLEX AND PREPARATION METHOD AND USE THEREOF

(71) Applicant: YANGZHOU UNIVERSITY, Jiangsu (CN)

(72) Inventors: Wang Zhang, Jiangsu (CN); Yuping Wang, Jiangsu (CN); Junqiang Guo, Jiangsu (CN); Guowang Diao, Jiangsu (CN)

(73) Assignee: Yangzhou University, Jiangsu (CN)

( * ) Notice: Subject to any disclaimer, the term of this patent is extended or adjusted under 35 U.S.C. 154(b) by 451 days.

(21) Appl. No.: 18/042,703

(22) PCT Filed: Sep. 29, 2022

(86) PCT No.: PCT/CN2022/122433
§ 371 (c)(1),
(2) Date: Feb. 23, 2023

(87) PCT Pub. No.: WO2023/098271
PCT Pub. Date: Jun. 8, 2023

(65) Prior Publication Data
US 2024/0287212 A1    Aug. 29, 2024

(30) Foreign Application Priority Data
Nov. 30, 2021    (CN) .......................... 202111442512.X (51) Int. Cl.
| | |
|---|---|
| *C08B 37/16* | (2006.01) |
| *C07C 279/18* | (2006.01) |
| *C08J 3/24* | (2006.01) |
| *C08L 5/16* | (2006.01) |

(52) U.S. Cl.
CPC ........ *C08B 37/0015* (2013.01); *C07C 279/18* (2013.01); *C08J 3/24* (2013.01); *C08L 5/16* (2013.01); *C08J 2405/16* (2013.01)

(58) Field of Classification Search
CPC .................................................... C07C 279/18
See application file for complete search history.

(56) References Cited

U.S. PATENT DOCUMENTS

| | | | |
|---|---|---|---|
| 2005/0028670 A1* | 2/2005 | Regen .................. | B01D 53/228 95/45 |
| 2005/0256083 A1 | 11/2005 | Chang et al. | |

FOREIGN PATENT DOCUMENTS

| | | |
|---|---|---|
| CN | 102942717 A | 2/2013 |
| CN | 103027059 A | 4/2013 |
| CN | 108864480 A | 11/2018 |
| CN | 112280617 A | 1/2021 |
| CN | 114085298 A | 2/2022 |
| JP | 2006321784 A | 11/2006 |
| JP | 2013124351 A | 6/2013 |

OTHER PUBLICATIONS

Servati et al., "Silica bonded calix[4]arene as an efficient, selective and reusable sorbent for rubber chemical additives" Journal of Porous Materials vol. 25 pp. 1463-1474, DOI:10.1007/s10934-018-0559-6 (Year: 2018).*
Verdizadeh et al., "Liquid-liquid extraction-chromogenic systems containing tungsten (VI), 2-Hydroxy-5-Chlorothiophenol and Diphenylguanidine" International Journal of Chemical Studies vol. 4 No. 3 pp. 7-12 (Year: 2016).*
PCT Search Report, Int. Serial No. PCT/CN2022/122433, Int. Filing Date: Sep. 29, 2022, Applicant: Yangzhou University, Date: Nov. 22, 2022.
Chinese Office Action, Priority No. 202111442512.X, Date: Aug. 3, 2022.

* cited by examiner

*Primary Examiner* — Andrea Olson
(74) *Attorney, Agent, or Firm* — Reising Ethington P.C.

(57) ABSTRACT

The present disclosure provides a water-soluble 1,3-diphenylguanidine (DPG)-based supramolecular inclusion complex and a preparation method and use thereof. A supramolecular compound and a vulcanization accelerator DPG are subjected to supramolecular interaction to form a DPG-based supramolecular inclusion complex. While improving water solubility and dispersibility of the DPG, a molecular structure of the DPG can be completely retained, and the supramolecular host used does not affect a performance of latex. The supramolecular compound and the DPG are ball milled in a certain proportion to prepare the DPG-based supramolecular inclusion complex, the water-soluble DPG-based supramolecular inclusion complex is added in a natural latex curing process; and after mixing evenly, a mixture is foamed on-machine, vulcanized in a steamer, and dried to obtain a latex foam product. The latex product has significantly improved tensile strength and elongation at break, and reduced hardness, which is more healthy and hygienic, showing broad market prospects.

12 Claims, 7 Drawing Sheets

WATER-SOLUBLE 1,3-DIPHENYLGUANIDINE (DPG)-BASED SUPRAMOLECULAR INCLUSION COMPLEX AND PREPARATION METHOD AND USE THEREOF

CROSS REFERENCE TO RELATED APPLICATION

The present application claims priority to Chinese Patent Application No. 202111442512.X filed to the China National Intellectual Property Administration (CNIPA) on Nov. 30, 2021 and entitled "WATER-SOLUBLE 1,3-DIPHENYLGUANIDINE (DPG)-BASED SUPRAMOLECULAR INCLUSION COMPLEX AND PREPARATION METHOD AND USE THEREOF", which is incorporated herein by reference in its entirety.

TECHNICAL FIELD

The present disclosure relates to the field of latex industry, in particular to a water-soluble 1,3-diphenylguanidine (DPG)-based supramolecular inclusion complex for foaming of latex foam and a preparation method and use thereof.

BACKGROUND 1,3-diphenylguanidine (DPG), as a medium-speed accelerator for rubber vulcanization, is generally used as a secondary accelerator that works synergistically with thiazole thiurams and sulfenamide accelerators. The DPG as a secondary accelerator for rubber helps to produce a faster cure activation effect, imparting high modulus and tensile strength to the rubber. Nowadays, in the latex industry, DPG is generally prepared into a dispersion with a solid content of about 50% by a ball mill. Due to an extremely low solubility (about 315 mg/L in water at 25° C.), the DPG is prone to deposition, resulting in uneven dispersion and high local concentration, thereby causing partial gelation of the latex and directly affecting the vulcanization efficiency.

SUMMARY

A purpose of the present disclosure is to solve the problem that DPG is prone to deposition, resulting in uneven dispersion and high local concentration, thereby causing partial gelation of the latex.

The present disclosure provides a water-soluble DPG-based supramolecular inclusion complex, where the supramolecular inclusion complex is formed by a supramolecular compound and DPG through intermolecular interaction.

Further, the supramolecular compound is any one or a mixture of any two or more selected from the group consisting of hydroxypropyl-ß-cyclodextrin (HP-β-CD), a β-cyclodextrin polymer (β-CDP), a calixarene sulfate, and an aminated pillararene. The supramolecular compound has a special structure that can improve the solubility of DPG, and the supramolecular compound does not affect the performance of latex.

Further, a mass content of the supramolecular inclusion is 20% to 30% of that of the DPG.

The present disclosure further provides a preparation method of the water-soluble DPG-based supramolecular inclusion complex, including the following steps: in parts by weight, dissolving 1 part to 3 parts of the supramolecular compound in 10 parts to 50 parts of water, adding 1 part to 3 parts of the DPG, mixing thoroughly by ball milling, filtering, and drying a resulting filtrate to obtain the water-soluble DPG-based supramolecular inclusion complex.

The content of DPG in the supramolecular inclusion complex can be adjusted by controlling the milling frequency and time. In the present disclosure, the DPG content in the supramolecular inclusion complex is 20% to 30% by ball milling at 21 Hz to 25 Hz under a room temperature for 20 min to 100 min.

In the present disclosure, the water-soluble DPG-based supramolecular inclusion complex can be used in foam molding of latex foam.

The present disclosure further provides a method for foam molding of latex foam, including the following steps:
  (1) in parts by weight, adding 0.01 parts to 0.1 parts of potassium pyrophosphate, 10 parts to 15 parts of potassium oleate, 10 parts to 15 parts of castor oil, 30 parts to 40 parts of a sulfur dispersion, and 0.1 parts to 0.5 parts of potassium hydroxide into 500 parts to 520 parts of a natural latex solution, and conducting pre-vulcanization to obtain a mixture A; and
  (2) in parts by weight, adding 0.1 parts to 0.5 parts of the water-soluble DPG-based supramolecular inclusion complex into the mixture A, stirring for 20 min to 40 min and conducting foaming, injecting 20 parts to 25 parts of zinc oxide and 20 parts to 25 parts of a hardening agent sodium fluorosilicate during the foaming, injecting a foamed latex mixture into a mold, conducting vulcanization and shaping in a steamer, and washing and drying to obtain a foaming product of the latex foam.

Further, the sulfur dispersion includes sulfur, an accelerator M, an accelerator ZDC, a dispersant N, an antioxidant WL, and water at a weight ratio of (100-120):(50-70):(50-70):(5-8):(20-35):(140-170).

The present disclosure has the following beneficial effects over the prior art:
  1. The synthesis of the water-soluble DPG-based supramolecular inclusion complex is to form an inclusion complex through interaction between the supramolecular compound and the DPG that serve as a host and a guest, that is, DPG molecules can enter a molecular cavity of the supramolecular compound. This force belongs to intermolecular interaction without chemical modification. By selecting the supramolecular compound with desirable water solubility and high thermal stability, water solubility and thermal stability of the DPG can be improved without changing a molecular structure of the DPG, and the supramolecular compound does not affect the performance of latex.
  2. The water-soluble DPG-based supramolecular inclusion complex can be formulated into an aqueous solution, which can be well dispersed in latex, reducing the gelation of DPG in the latex due to excessive local concentration.
  3. The water-soluble DPG-based supramolecular inclusion complex can act synergistically with thiazole accelerators to form a large number of polysulfides to promote vulcanization, which helps to produce a faster curing activation effect. The latex foam product added with the water-soluble DPG-based supramolecular inclusion complex has a tensile strength of 0.1 MPa to 0.2 MPa and an elongation at break of 200% to 300%.
  4. The preparation method of the water-soluble DPG-based supramolecular inclusion complex is simple and easy to operate. The supramolecular compounds (such as the cyclodextrin, calixarene, and pillararene) each are safe, non-toxic, and environmental-friendly. Meanwhile, the water-soluble DPG-based supramolecular inclusion complex has a high utilization rate, which can reduce an input of the DPG to save costs.

DETAILED DESCRIPTION OF THE EMBODIMENTS

Experimental methods in the following examples are conventional methods, unless otherwise specified. Test materials used in the following examples are purchased from commercial channels, unless otherwise specified.

I. Preparation of a Water-Soluble DPG-Based Supramolecular Inclusion Complex

A supramolecular compound was dissolved in water, DPG was added, ball milling was conducted to mix well, a mixture was filtered, and a filtrate was dried to obtain the water-soluble DPG-based supramolecular inclusion complex.

The content of DPG in the supramolecular inclusion complex was adjusted by controlling the milling frequency and time.

Example 1

A preparation method of a DPG-HP-β-CD-based inclusion complex by ball milling for 20 min included the following steps:

20 ml of water was added to 2.286 g of HP-β-CD; after the HP-β-CD was completely dissolved, 0.211 g of DPG was added, and ball milling was conducted at 21 Hz under a room temperature for 20 min to fully mix the raw materials; unreacted DPG was removed by filtration, and an obtained filtrate was dried to obtain the water-soluble DPG-HP-β-CD-based inclusion complex.

Example 2

A preparation method of a DPG-HP-β-CD-based inclusion complex by ball milling for 60 min included the following steps:

20 ml of water was added to 2.286 g of HP-β-CD; after the HP-β-CD was completely dissolved, 0.211 g of DPG was added, and ball milling was conducted at 21 Hz under a room temperature for 60 min to fully mix the raw materials; unreacted DPG was removed by filtration, and an obtained filtrate was dried to obtain the water-soluble DPG-HP-β-CD-based inclusion complex.

Example 3

A preparation method of a DPG-HP-β-CD-based inclusion complex by ball milling for 100 min included the following steps:

20 ml of water was added to 2.286 g of HP-β-CD; after the HP-β-CD was completely dissolved, 0.211 g of DPG was added, and ball milling was conducted at 21 Hz under a room temperature for 100 min to fully mix the raw materials; unreacted DPG was removed by filtration, and an obtained filtrate was dried to obtain the water-soluble DPG-HP-β-CD-based inclusion complex.

Example 4

A preparation method of a DPG-β-CDP-based inclusion complex by ball milling for 60 min included the following steps:

20 ml of water was added to 3.054 g of β-CDP; after the β-CDP was completely dissolved, 0.211 g of DPG was added, and ball milling was conducted at 21 Hz under a room temperature for 60 min to fully mix the raw materials; unreacted DPG was removed by filtration, and an obtained filtrate was dried to obtain the water-soluble DPG-β-CDP-based inclusion complex.

Table 1 Content of DPG in supramolecular inclusion complex at different ball milling times

|  | Example 1 | Example 2 | Example 3 |
| --- | --- | --- | --- |
| Time (min) | 20 | 60 | 100 |
| Encapsulation efficiency (%) | 17 | 34 | 22 |

Encapsulation efficiency (%)=mass of DPG in inclusion complex/initial mass of DPG×100%

The results in Table 1 showed that the water-soluble DPG-based supramolecular inclusion complex prepared by ball milling could control a DPG content (encapsulation efficiency) at 17% to 34%; when ball milling for 60 min, the content of DPG in the supramolecular inclusion complex reached a maximum, showing the best effect.

II. Water-Soluble DPG-Based Supramolecular Inclusion Complex Added in a Latex Curing Process Example 5

Figure 6:
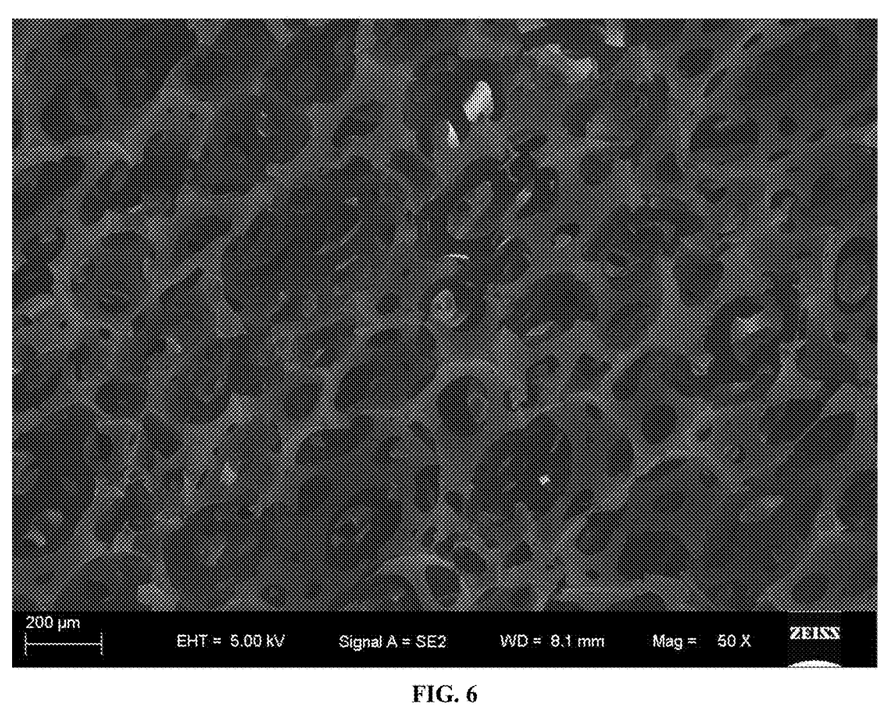
FIG. 6 shows a scanning electron microscopy (SEM) image of Example 5 in the present disclosure.

The water-soluble DPG-HP-β-CD-based inclusion complex prepared in Example 2 in a latex curing process, including the following steps:

(1) 6 g of potassium pyrophosphate, 180 g of potassium oleate, 60 g of castor oil, 420 g of a sulfur dispersion (including sulfur, an accelerator M, an accelerator ZDC, a dispersant N, an antioxidant WL, and water in a weight ratio of 110:60:60:7:33:150), and 18 g of potassium hydroxide were added to 6 kg of a natural latex solution, stirred, and cured at 35° C. for 4 h to obtain a mixture A; and (2) 12 g of the water-soluble DPG-HP-β-CD-based inclusion complex into the mixture A, stirred for 30 min and foaming is conducted, 300 g of zinc oxide and 300 g of a hardening agent sodium fluorosilicate were injected during the foaming, a foamed latex mixture was injected into a mold, vulcanization was conducted in a steamer for 30 min, and dried at 80° C. to obtain a sample of the latex foam with a SEM image shown in FIG. 6.

Example 6

Figure 7:
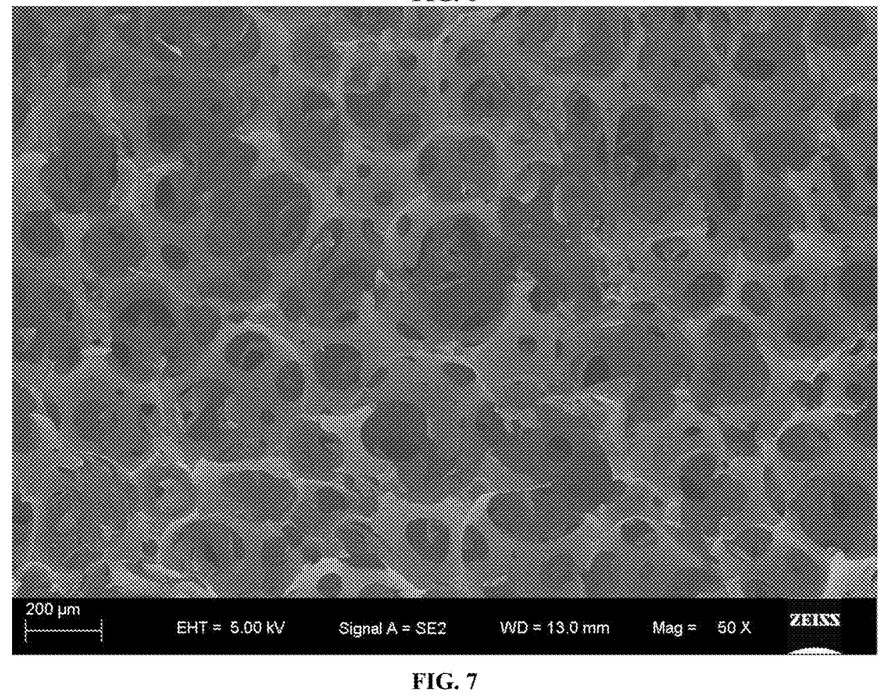
FIG. 7 shows a SEM image of Example 6 in the present disclosure.

The water-soluble DPG-β-CDP-based inclusion complex prepared in Example 4 in a latex curing process, including the following steps:

(1) 6 g of potassium pyrophosphate, 180 g of potassium oleate, 60 g of castor oil, 420 g of a sulfur dispersion (including sulfur, an accelerator M, an accelerator ZDC, a dispersant N, an antioxidant WL, and water in a weight ratio of 110:60:60:7:33:150), and 18 g of potassium hydroxide were added to 6 kg of a natural latex solution, stirred, and cured at 35° C. for 4 h to obtain a mixture A; and (2) 12 g of the water-soluble DPG-β-CDP-based inclusion complex into the mixture A, stirred for 30 min and foaming is conducted, 300 g of zinc oxide and 300 g of a hardening agent sodium fluorosilicate were injected during the foaming, a foamed latex mixture was injected into a mold, vulcanization was conducted in a steamer for 30 min, and dried at 80° C. to obtain a sample of the latex foam with a SEM image shown in FIG. 7.

COMPARATIVE EXAMPLE

In this comparative example, a DPG dispersion with a solid content of 50% was added during the latex curing process.

Figure 8:
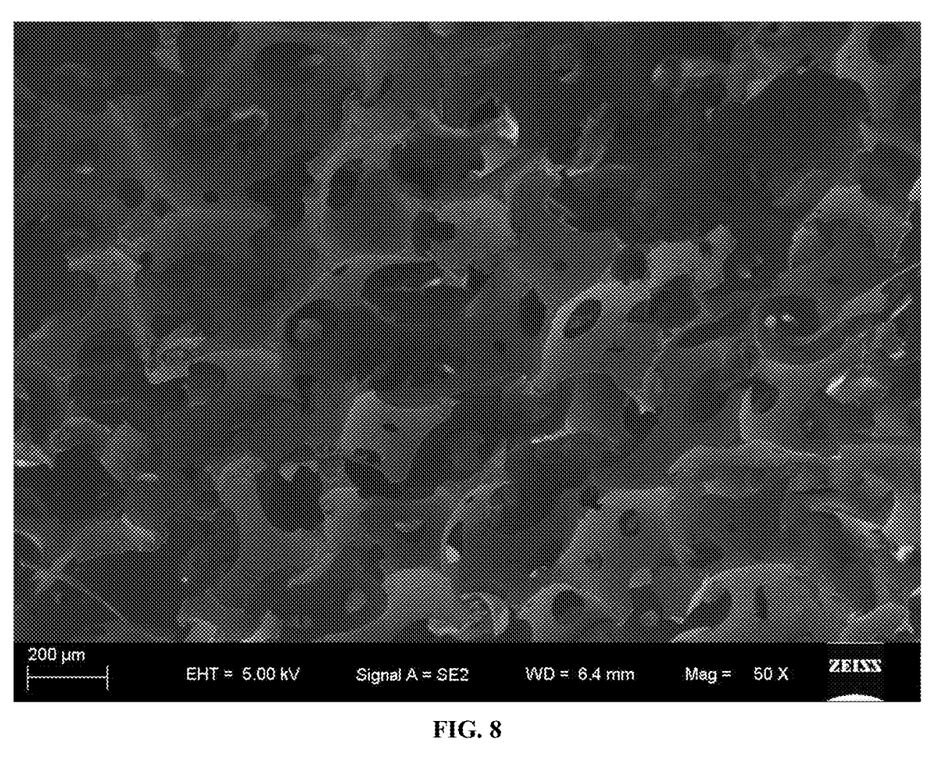
FIG. 8 shows a SEM image of a comparative example in the present disclosure.

The method included the following steps:

(1) Preparation of a DPG dispersion: 20 g of DPG and 20 g of water were added into a ball mill tank, and subjected to ball milling at 21 Hz under a room temperature for 60 min to obtain the DPG dispersion with a solid content of 50%;

(2) 6 g of potassium pyrophosphate, 180 g of potassium oleate, 60 g of castor oil, 420 g of a sulfur dispersion (including sulfur, an accelerator M, an accelerator ZDC, a dispersant N, an antioxidant WL, and water in a weight ratio of 110:60:60:7:33:150), and 18 g of potassium hydroxide were added to 6 kg of a natural latex solution, stirred, and cured at 35° C. for 4 h to obtain a mixture A; and (3) 12 g of the DPG dispersion prepared in step (1) was added into the mixture A, stirred for 30 min and foaming is conducted, 300 g of zinc oxide and 300 g of a hardening agent sodium fluorosilicate were injected during the foaming, a foamed latex mixture was injected into a mold, vulcanization was conducted in a steamer for 30 min, and dried at 80° C. to obtain a sample of the latex foam with a SEM image shown in FIG. 8.

Table 2 Performance characterization comparison of Example 5, Example 6, and Comparative Example

| Item | Unit | Example 5 | Example 6 | Comparative Example |
|---|---|---|---|---|
| Tensile strength | KPa | 73.7 | 69.2 | 49.3 |
| Elongation at break | % | 400.7 | 393.8 | 305.6 |
| Rebound rate | % | 60.8 | 61.9 | 67.2 |
| Hardness | N | 79.4 | 95.6 | 90.2 |

It was seen from Table 2 that the tensile strength and elongation at break of Examples 5 and 6 were significantly improved compared with those of the Comparative Example, and the rebound rate had little change. It indicated that the water-soluble DPG-based supramolecular inclusion complex could optimize the mechanical properties of natural latex foam.

Figure 1:
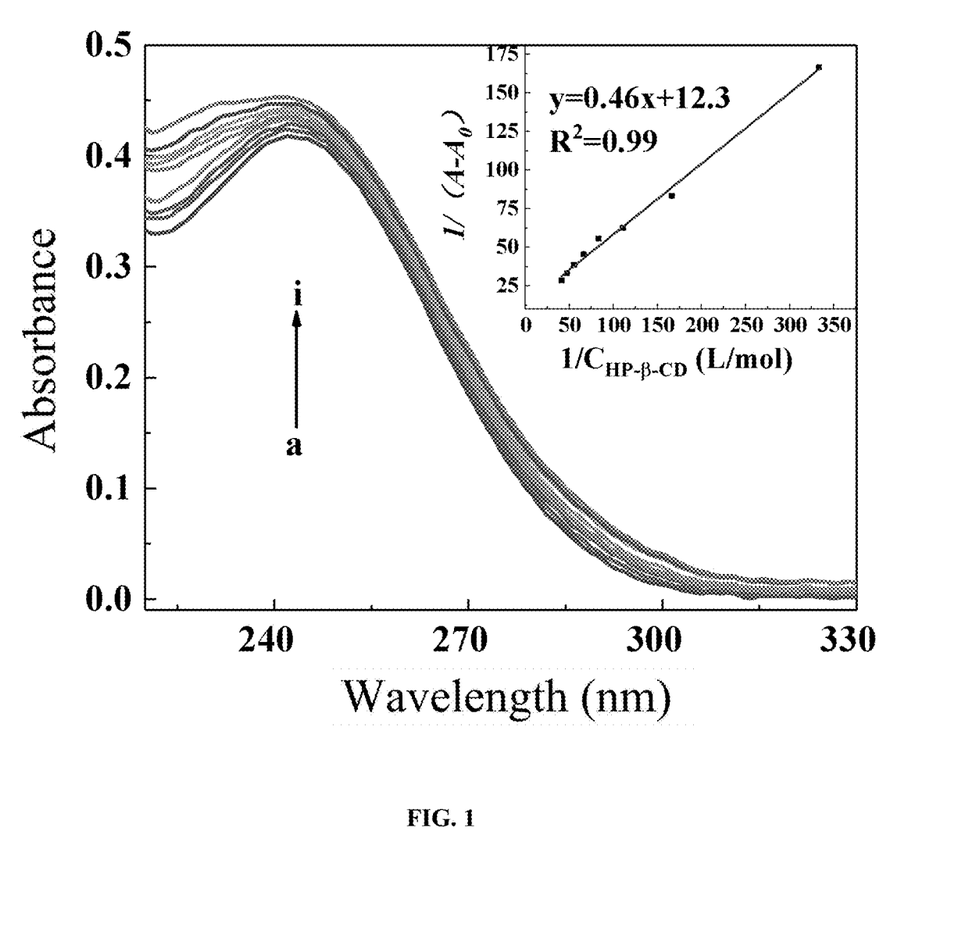
FIG. 1 shows a UV spectrum of ethylene glycol solutions (mmol/L) of DPG-HP-β-CD with different concentrations: (a) 0, (b) 3, (c) 6, (d) 9, (e) 12, (f) 15, (g) 18, (h) 21, (i) 24, a linear fitting graph of an absorbance at 244 nm and a concentration of DPG-HP-β-CD.
Figure 2:
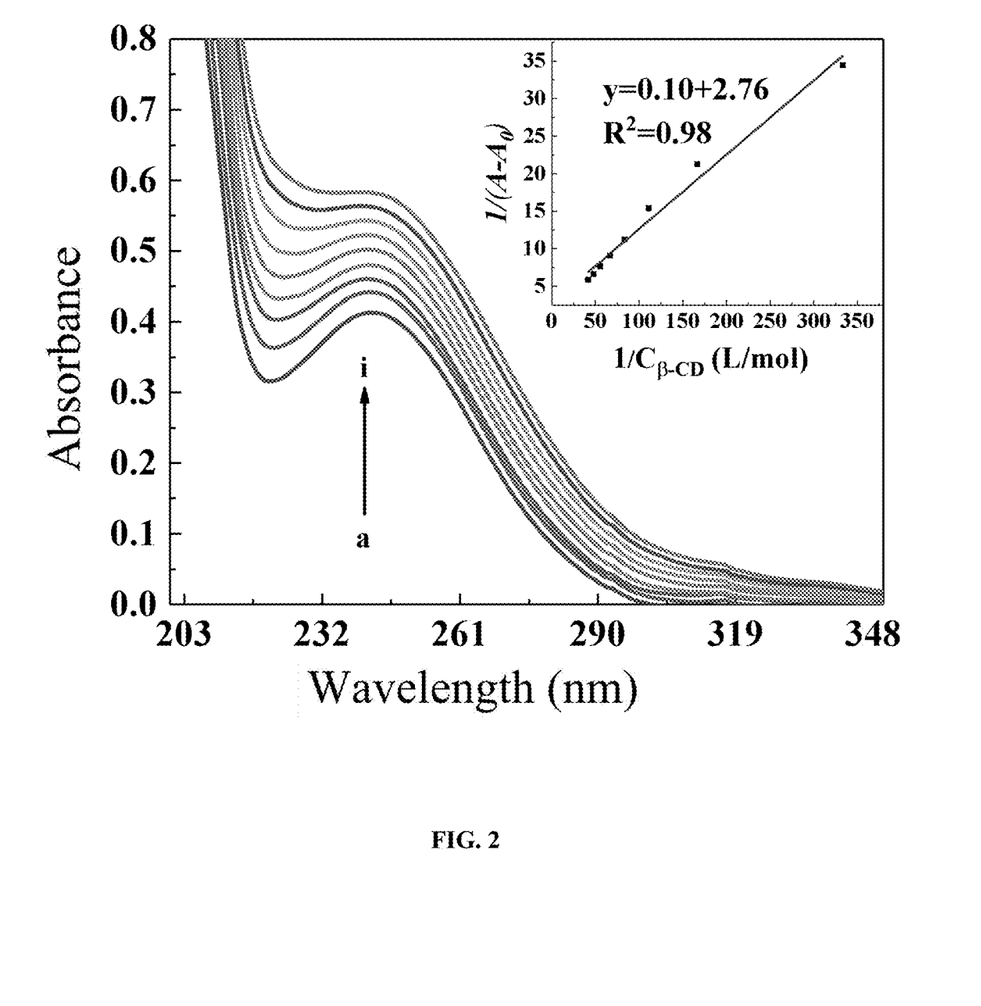
FIG. 2 shows a UV spectrum of ethylene glycol solutions (mmol/L) of DPG-β-CDP with different concentrations: (a) 0, (b) 3, (c) 6, (d) 9, (e) 12, (f) 15, (g) 18, (h) 21, (i) 24, a linear fitting graph of an absorbance at 244 nm and a concentration of DPG-β-CDP.

Characterization of the Water-Soluble DPG-Based Supramolecular Inclusion Complex 1. Determination of Inclusion Ratio and Inclusion Constant of Inclusion Complex by Ultraviolet-Visible Spectroscopy Taking Examples 2 and 4 as examples, the UV titration spectra of HP-β-CD, β-CDP, and DPG were shown in FIG. 1 and FIG. 2. It was seen from FIG. 1 and FIG. 2 that with an increase of the concentration of HP-β-CD and β-CDP, the ultraviolet absorption intensity of DPG increased linearly, indicating that β-cyclodextrin derivatives formed an inclusion complex with DPG, with an inclusion ratio of 1:1 (the inclusion ratio referred to a molar ratio of the β-cyclodextrin derivatives to the DPG). According to a Benesi-Hildebrand method (*J. Am. Chem. Soc.* 1949, 71, 8, 2703-2707), it was obtained that: at 25° C., the complexation stability constants of HP-β-CD and β-CDP with DPG were 26.87 L/mol and 27.88 L/mol, respectively.

2. Infrared Spectral Analysis

Figure 3:
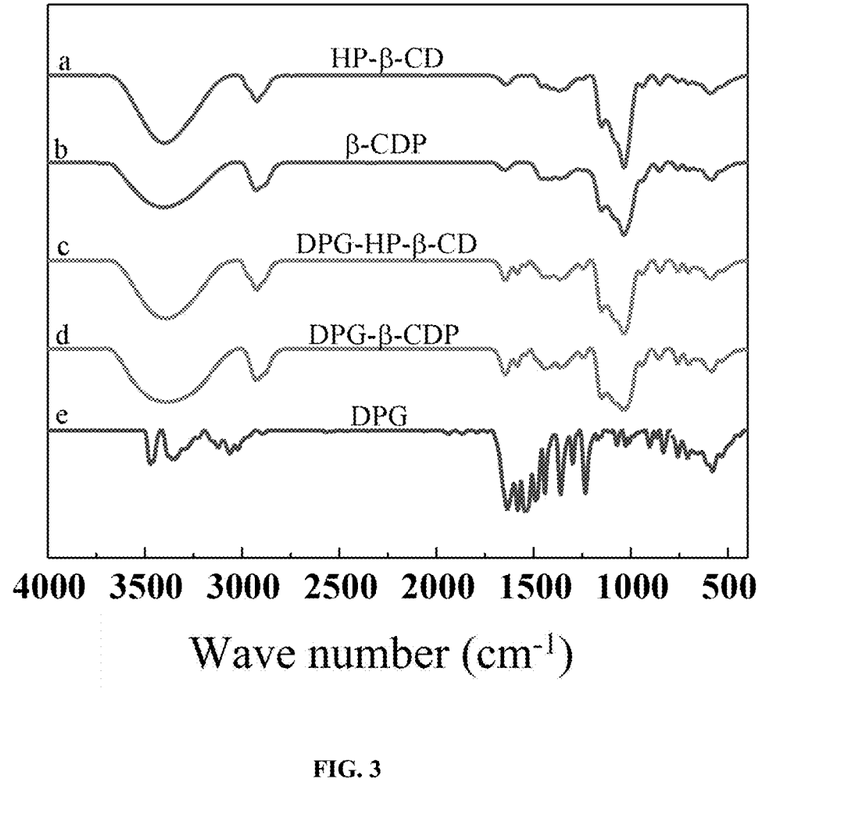
FIG. 3 shows infrared spectrograms of HP-β-CD (a), β-CDP (b), DPG-HP-β-CD (c), DPG-β-CDP (d), and DPG (e)

Taking Examples 2 and 4 as examples, the DPG raw material, HP-β-CD, β-CDP, and their respective inclusion complexes were identified by infrared spectroscopy, and the results were shown in FIG. 3. It was seen from FIG. 3 that the infrared spectrum of the inclusion complex was similar to that of cyclodextrin. However, characteristic peaks of DPG appeared in the spectrum of inclusion complex and red shifted: C=C stretching vibrations of aromatics at 1,581 $cm^{-1}$ and 1,540 $cm^{-1}$ moved to 1,583 $cm^{-1}$ and 1,542 $cm^{-1}$, indicating that DPG and β-cyclodextrin derivatives were subjected to inclusion and formed inclusion complexes.

3. Thermogravimetric Analysis

Figure 4:
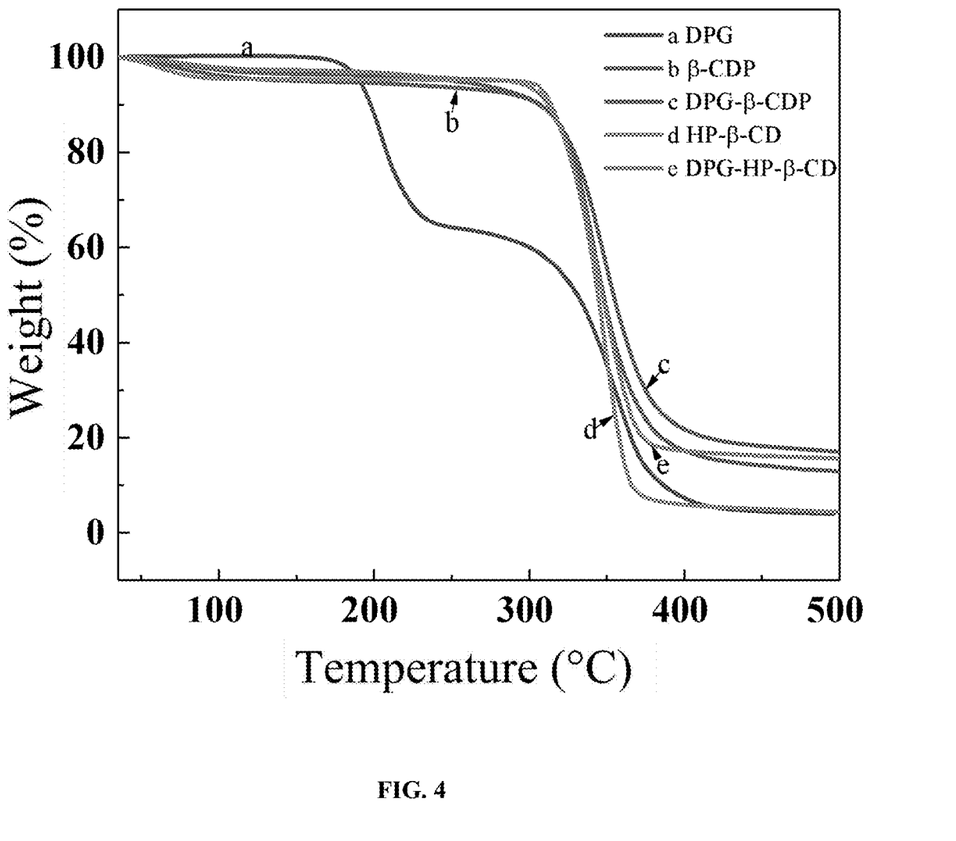
FIG. 4 shows thermogravimetric diagrams of DPG (a), β-CDP (b), DPG-β-CDP (c), HP-β-CD (d), and DPG-HP-β-CD (e)

Taking Examples 2 and 4 as examples, the thermal stability of DPG raw materials, HP-β-CD, β-CDP and their respective inclusion complexes were analyzed by thermogravimetric analysis, and the results were shown in FIG. 4. FIG. 4 showed that DPG began to decompose at 166° C. and underwent a second decomposition at 256° C. However, DPG after the inclusion with β-cyclodextrin derivatives began to decompose only when the temperature reached a melting point of the β-cyclodextrin derivatives, indicating that the formation of water-soluble DPG-based supramolecular inclusion complex improves the thermal stability of DPG.

4. Solubilization Experiment of the Water-Soluble Supramolecular Inclusion Complex.

Figure 5:
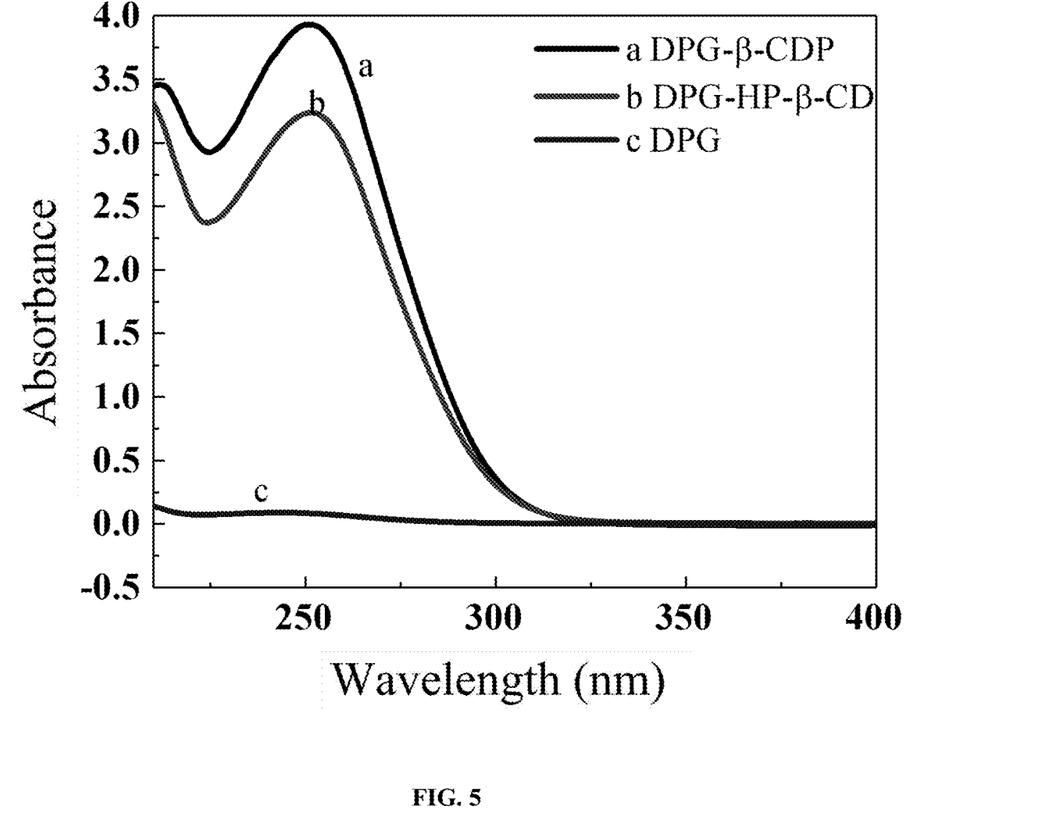
FIG. 5 shows ultraviolet absorption spectrograms of DPG-β-CDP (a), DPG-HP-β-CD (b), and DPG (c)

Taking Examples 2 and 4 as examples, the solubilization effect was verified by comparing and analyzing absorption peaks of ultraviolet-visible spectra of the DPG raw material, the DPG-β-CDP inclusion complex, and the DPG-HP-β-CD inclusion complex. The results were shown in FIG. 5, β-CDP and HP-β-CD had no ultraviolet absorption peaks. Since DPG was insoluble in water, the absorption peak of a DPG aqueous solution was highly weak near 244 nm; however, DPG-β-CDP inclusion complex and DPG-HP-β-CD inclusion complex showed a strong absorption peak at 244 nm. By calculation, DPG had a solubility of 0.315 mg/mL, DPG-β-CDP inclusion complex had a solubility of 24.95 mg/mL, and DPG-HP-β-CD inclusion complex had a solubility of 20.55 mg/mL, indicating that the β-cyclodextrin derivatives could improve the solubility of DPG very well.

The above description of examples is merely provided to help illustrate the method of the present disclosure and a core idea thereof. It should be noted that several improvements and modifications may be made by persons of ordinary skill in the art without departing from the principle of the present disclosure, and these improvements and modifications should also fall within the protection scope of the present disclosure. Various amendments to these embodiments are apparent to those of professional skill in the art, and the general principles defined herein may be implemented in other embodiments without departing from the spirit or scope of the present disclosure. Thus, the present disclosure is not limited to the examples shown herein but falls within the widest scope consistent with the principles and novel features disclosed herein.

What is claimed is:

1. A water-soluble 1,3-diphenylguanidine (DPG)-based supramolecular inclusion complex, wherein the supramolecular inclusion complex is formed by a supramolecular compound and DPG through intermolecular interaction, and the supramolecular compound is any one or a mixture of any two or more selected from the group consisting of hydroxypropyl-β-cyclodextrin, a β-cyclodextrin polymer, a calixarene sulfate, and an aminated pillararene.

2. The water-soluble DPG-based supramolecular inclusion complex according to claim 1, wherein a mass content of the supramolecular inclusion is 20% to 30% of that of the DPG.

3. The water-soluble DPG-based supramolecular inclusion complex according to claim 1, wherein a mass content of the supramolecular inclusion is 17%, 22%, or 34% of that of the DPG.

4. A preparation method of the water-soluble DPG-based supramolecular inclusion complex according to claim 1, comprising the following steps: in parts by weight, dissolving 1 part to 3 parts of the supramolecular compound in 10 parts to 50 parts of water, adding 1 part to 3 parts of the DPG, mixing by ball milling, filtering, and drying a resulting filtrate to obtain the water-soluble DPG-based supramolecular inclusion complex.

5. The preparation method according to claim 4, wherein the ball milling is conducted at 21 Hz to 25 Hz under a room temperature for 20 min to 100 min.

6. The preparation method according to claim 4, wherein the ball milling is conducted at 21 Hz.

7. A method for foam molding of latex foam, comprising the following steps:
   (1) in parts by weight, adding 0.01 parts to 0.1 parts of potassium pyrophosphate, 10 parts to 15 parts of potassium oleate, 10 parts to 15 parts of castor oil, 30 parts to 40 parts of a sulfur dispersion, and 0.1 parts to 0.5 parts of potassium hydroxide into 500 parts to 520 parts of a natural latex solution, and conducting pre-vulcanization to obtain a mixture A; and
   (2) in parts by weight, adding 0.1 parts to 0.5 parts of a water-soluble DPG-based supramolecular inclusion complex into the mixture A, stirring for 20 min to 40 min and conducting foaming, injecting 20 parts to 25 parts of zinc oxide and 20 parts to 25 parts of a hardening agent sodium fluorosilicate during the foaming, injecting a foamed latex mixture into a mold, conducting vulcanization and shaping in a steamer, and washing and drying to obtain a foaming product of the latex foam; wherein
   the water-soluble DPG-based supramolecular inclusion complex is the water-soluble DPG-based supramolecular inclusion complex according to claim 1.

8. The method according to claim 7, wherein the sulfur dispersion comprises sulfur, an accelerator M, an accelerator ZDC, a dispersant N, an antioxidant WL, and water at a weight ratio of (100-120):(50-70):(50-70):(5-8):(20-35):(140-170).

9. The preparation method according to claim 4, wherein a mass content of the supramolecular inclusion is 20% to 30% of that of the DPG.

10. The preparation method according to claim 4, wherein a mass content of the supramolecular inclusion is 17%, 22%, or 34% of that of the DPG.

11. The preparation method according to claim 5, wherein the ball milling is conducted at 21 Hz.

12. The preparation method according to claim 11, wherein the ball milling is conducted for 20 min, 60 min, or 100 min.

* * * * *